United States Patent
Menegoz et al.

(10) Patent No.: US 10,834,938 B2
(45) Date of Patent: Nov. 17, 2020

(54) SWEET FOOD PRODUCT MADE FROM DRY FRUIT

(71) Applicant: SONAFI, Viroflay (FR)

(72) Inventors: Mathias Menegoz, Etoile sur Rhône (FR); Sébastien Charve, Chabeuil (FR)

(73) Assignee: SONAFI, Viroflay (FR)

( * ) Notice: Subject to any disclaimer, the term of this patent is extended or adjusted under 35 U.S.C. 154(b) by 293 days.

(21) Appl. No.: 15/038,084

(22) PCT Filed: Nov. 24, 2014

(86) PCT No.: PCT/IB2014/066294
§ 371 (c)(1),
(2) Date: May 20, 2016

(87) PCT Pub. No.: WO2015/075697
PCT Pub. Date: May 28, 2015

(65) Prior Publication Data
US 2016/0295879 A1    Oct. 13, 2016

(30) Foreign Application Priority Data

Nov. 25, 2013  (EP) .................................... 13306606

(51) Int. Cl.
  *A23G 3/48*    (2006.01)
  *A23G 3/34*    (2006.01)
  *A23G 3/42*    (2006.01)

(52) U.S. Cl.
  CPC ............... *A23G 3/48* (2013.01); *A23G 3/343* (2013.01); *A23G 3/346* (2013.01); *A23G 3/42* (2013.01); *A23V 2002/00* (2013.01)

(58) Field of Classification Search
  CPC ...................................................... A23G 3/48
  See application file for complete search history.

(56) References Cited

U.S. PATENT DOCUMENTS

| | | | |
|---|---|---|---|
| 3,115,412 A | 12/1963 | Schoppe et al. | |
| 5,753,296 A * | 5/1998 | Girsh | A23G 1/02 426/425 |
| 6,623,783 B1 * | 9/2003 | Wong | A23L 25/10 426/519 |
| 6,716,471 B2 * | 4/2004 | Kramer | A23C 11/06 426/584 |
| 2009/0304867 A1 * | 12/2009 | Rabault | A23G 1/305 426/61 |
| 2011/0244081 A1 * | 10/2011 | Treccase | A23G 1/32 426/72 |

FOREIGN PATENT DOCUMENTS

| | | | | |
|---|---|---|---|---|
| EP | 0513462 A1 | | 11/1992 | |
| EP | 1405567 A1 | | 4/2004 | |
| EP | 2599390 A1 | | 6/2013 | |
| FR | 2722952 A1 | | 2/1996 | |
| GB | 963764 A | | 7/1964 | |
| GB | 2468692 A | * | 9/2010 | ............... A23G 1/48 |
| WO | 2007/116429 A1 | | 10/2007 | |

OTHER PUBLICATIONS

Honeycutt. "How do I store coconut oil?" Available online from www.livestrong.com as of Sep. 10, 2019. pp. 1-5. (Year: 2019).*
International Search Report issued in corresponding International Patent Application No. PCT/IB2014/066294 dated Feb. 19, 2015.

* cited by examiner

*Primary Examiner* — Jenna A Watts
(74) *Attorney, Agent, or Firm* — Morgan, Lewis & Bockius LLP

(57) ABSTRACT

The present invention relates to a sweet food product made from dry fruit having the same physicochemical properties as chocolate and comprising: between 25 and 45% by weight of dry fruit representing a total fat contribution coming from said dry fruit representing, at most, 25% by weight relative to the total weight of said food product; between 25 and 45% by weight of saccharose or another anhydrous sweetening material; between 20 and 40% by weight of cocoa butter or any other vegetable fat, solid at ambient temperature, used as a partial or total substitute for the cocoa butter; optionally, an emulsifier at a content of less than or equal to 1%; said sweet food product having a particle size of less than or equal to 50 μm, and the method for preparing same.

7 Claims, No Drawings

SWEET FOOD PRODUCT MADE FROM DRY FRUIT

This invention relates to the field of food industry and more particularly the sweet products industry. It is more specifically applicable to a new food product based on dry fruits with particular organoleptic and rheological properties.

Its purpose is to disclose a new food product that could technically act as a substitute for chocolate and thus be used to create ranges of sweet products with tastes different from chocolate. The Applicant has paid special attention to the development of a food product based on dry fruits that would have the physical properties and particularly the rheological properties of chocolate.

The term dry fruits refers to dried fruits and equally to seeds and dry fruits particularly including fruits in shells.

There are various sweetened food products including dry fruits, particularly including spreads made of a mix of cocoa powder (and/or cocoa beans) and hazelnuts, gianduja, praline that is a mix of sugar and dry fruits (with a content of at least 50%) or a praline filling (product composed of praline as defined above and other ingredients); however these products do not satisfy the requirements of the Applicant for various reasons; their taste is not the taste of dry fruit only and furthermore, their texture is too soft or too friable, and cannot be used for the applications envisaged by the Applicant.

In this case, the required texture is that of milk chocolate or dark chocolate, in other words a solid and crisp product at ambient temperature but that becomes fluid when heated and among other things can be used for coating of sweets, for preparation of molded sweets or for confectionary type applications (creams, ganache, mousse, etc.).

The Applicant has encountered various difficulties in developing this product because the required texture could only be obtained with the use of additives that changed the taste of the dry fruit. The Applicant finally succeeded in developing a product with a pronounced taste of dry fruit and with a texture identical to the texture of chocolate, by controlling the fat content in the dry fruits used.

Thus, this invention relates to a sweetened food product based on dry fruit including:

- between 25 and 45% of dry fruit with a total fat content originating from said dry fruit representing not more than 25% and preferably 20%, and even more preferably 15% by weight relative to the total weight of said food product; preferably, said dry fruit has a fat content less than or equal to 65%, preferably 40%, even more preferentially 35% by weight relative to the total weight of dry fruit;
- between 25 and 45% by weight of saccharose or another anhydrous sweetening material, in other words containing not more than 6% by weight of water relative to the total weight of said saccharose or said sweetening material; for example, this other sweetening material may be anhydrous maltitol;
- between 20 and 40% by weight of cocoa butter or any other vegetable fat that is solid at ambient temperature (between 18 and 25° C.) used as a partial or total substitute for cocoa butter, for example illipe butter or Shea butter;
- optionally, an emulsifier with a content of less than or equal to 1%, preferably 0.5% by weight; those skilled in the art will be able to choose the most appropriate food emulsifier for the raw materials used; for example it might be lecithin, polyglycerol polyricinoleate E 476, mono and/or di-glyceride of fatty acids E 471, etc., preferably, the emulsifier used is lecithin;

said sweetened food product having a size grading less than or equal to 50 µm, and preferably between 15 and 25 µm.

Unless mentioned otherwise, the contents mentioned above are expressed by weight relative to the total weight of the sweetened food product based on dry fruits.

Dry fruit means any dried fresh fruit, seed or shell fruit, particularly almonds, hazelnuts, walnuts, cashew nuts, pecan nuts, pine nuts, pistachio nuts, sesame seeds, pumpkin seeds, sunflower seeds, poppy seeds, brazil nuts, macadamia nuts, Queensland nuts, Nangail nuts, chestnuts, or peanuts, etc. alone or mixed; preferably, they are dry fruits with shells, particularly hazelnut or almond. Those skilled in the art will know how to adjust the content of fatty materials in the dry fruit considered so as to comply with the specific features of the finished product. In particular, when necessary, the dry fruit may be deoiled using conventional techniques known to those skilled in the art, to reduce its fat content to not more than 65%, preferably not more than 40% and even more preferably not more than 35% by weight of the total weight of dry fruit.

When the dry fruit is a fresh dried fruit, it can be obtained by any method to reduce its water content and it is such that it contains a maximum water content of 7% by weight; preferably, the fresh dried fruits are obtained from apricot, mango, passion fruit, raspberry, strawberry, lemon, orange, coconut, pineapple, banana, kiwi, litchi, peach, apple, pear, etc.

The product according to the invention may be prepared using conventional techniques used during the preparation of chocolate products; therefore, a person skilled in the art will be able to manufacture the product according to the invention based on his general knowledge. A significant advantage of the product according to the invention is that it can be prepared industrially making use of chocolate production lines.

The product according to the invention may for example be prepared using a manufacturing method including the following steps:

a) mix and knead the ingredients (sugar or other sweetening material, dry fruit, cocoa butter or cocoa butter substitute and emulsifier);

b) grind the mix of ingredients; this step will achieve the required size grading of the finished product;

c) mix at a temperature higher than or equal to 40° C. for at least two hours;

d) optionally, tempering; this step is recommended when the fatty material used is composed largely of cocoa butter; it is a step during which product cooling is initiated so that fatty material crystallizes in stable form. The objective is to obtain a finished product that has the best long term characteristics (stability).

The grinding step b) and the mixing step with heating c) may be carried out one after the other; in this case, grinding b) precedes mixing with heating c). This step c) may then be done for a shorter period, for example between 5 and 10 hours; alternately, these two steps may be carried out at the same time depending on the selected process.

The product is generally molded after manufacturing.

The product according to the invention may be manufactured with whole dry fruits or previously ground dry fruits.

When grinding and mixing with heating c) are done in sequence, it is recommended that a dry fruit in powder form with a fine size grading should be used as the initial ingredient so as to obtain a finished product with the required rheological properties; in other words, a powder with a size grading of less than 315 μm for 90% of the mass at the beginning of the manufacturing process.

The grinding step used during the manufacturing process significantly reduces this size grading so that the size grading of the finished product is less than or equal to 50 μm, preferably between 15 and 25 μm.

As mentioned above, the physical properties of the product according to the invention are very similar to those of chocolate; these properties are characterized by a melting temperature range of the fatty material equal to between 20 and 40° C., and are such that it is completely melted at 40° C.; its fluidity (viscosity and pour limit) is very similar to that of couverture dark chocolate or milk chocolate, and it is solid at ambient temperature (18-25° C.)

These properties are such that the product is crisp and melts in the mouth, it has an intense taste of dry fruit.

The product according to the invention has the advantage that it can be used in all conventional chocolate applications; in particular, the product according to the invention can be used as a coating layer for confectionary or it can be shaped by molding. Although it provides an alternative to the use of chocolate, it does not require an investment for special equipment, particularly industrial manufacturing lines, because existing equipment used for chocolate is suitable.

The food product according to the invention can be used for chocolate, confectionary, biscuit or ice-cream type applications;

Chocolate applications include:
coating of sweets and chocolates;
production of Easter type moldings (chicken, egg, etc.) or any other type of molding (nut shapes, small characters, etc.);
production of chocolate fillings such as square coated ganache chocolates;
molding of bars, squares or any other moldable shape.
Confectionary applications include the preparation of:
creams;
whipped ganaches;
mousses;
sauce;
coating;
decoration;
confectionary ganache;
drinks;
and ice-cream applications include preparation of:
ice creams;
sorbets;

EXAMPLE 1

Preparation of a Food Product According to the Invention

This example describes preparation of a product according to the invention.

The recipe used is a recipe created from the following three ingredients:
crystallized white sugar
almond powder containing not more than 45% by weight of fatty material relative to the total weight of almonds
deodorized cocoa butter.

Each of these ingredients is added in the following proportions:

| Ingredient | % by weight relative to the total weight |
|---|---|
| Almond powder | 26% |
| White sugar | 40% |
| Deodorized cocoa butter | 34% |

In this example, the product is used on a conventional chocolate manufacturing line of the Kneading/Pregrinding/Grinding/Mixing type.

The main steps in preparation of this product are described below:

Mix raw materials/Kneading
Pre-grinding/Grinding
Mix
Tempering
Molding
Packaging Tempering is applied to the product at the following temperatures so that it can be molded:

T° tank: 50° C.

T° low: 26° C.

T° outlet: 28° C.

EXAMPLE 2

Rheological Characterization of a Food Product According to the Invention

This second example is aimed at describing the method for characterizing the rheology on a product obtained using the invention, that in this specific case will be a formulated product based on whole hazelnuts and that has the following formula and is prepared using the method described in example 1:

Product Formulation:

| | % of each ingredient |
|---|---|
| Whole hazelnuts | 27% |
| White sugar | 39% |
| Deodorized cocoa butter | 34% |

Principle:

The rheological behavior is monitored using a ROTO-VISCO 1 rotary rheometer at imposed speed.

Equipment:

ROTOVISCO RV1 measurement instrument from Thermo Fischer;

Thermostat-controlled bath at 40° C.;

REHOWIN application and measurement processing software—CASSON model;

DIN Z 20 (rotor) coaxial geometry systems

Results:

Flow limit: 12 Pa+/−1

Viscosity: 2 Pa·s+/−0.2

These values correspond to the rheological properties of coating chocolates; the results in example 2 thus show that the product according to the invention has exactly the same physical flow properties as chocolate.

EXAMPLE 3

Preparation of a Food Product According to the Invention

This example is intended to describe preparation of a product according to the invention.

The recipe used is a recipe formulated from the following three ingredients:
- Brown sugar;
- Dehydrated apple cubes, comprising not more than 5% by weight of water relative to the total weight of apple cubes and
- Deodorized cocoa butter;

in the following proportions:

| Ingredient | % by weight of the total weight |
|---|---|
| Dehydrated apple cubes | 24% |
| Brown sugar | 42% |
| Deodorized cocoa butter | 34% |

In this example, the product is used on a universal type chocolate manufacturing line.

Tempering is applied to the product at the following temperatures so that it can be molded:
- T° tank: 50° C.
- T° low: 26° C.
- T° outlet: 28° C.

The invention claimed is:

1. A sweetened food product based on dry fruit consisting of:
    between 25 and 45% by weight of dry fruit with a total fat content originating from said dry fruit representing not more than 25% by weight relative to the total weight of said food product;
    between 25 and 45% by weight of saccharose or another anhydrous sweetening material;
    between 20 and 40% by weight of cocoa butter or any other vegetable fat that is solid at ambient temperature used as a partial or total substitute for cocoa butter; and
    optionally, an emulsifier with a content of less than or equal to 1%, said sweetened food product having a size grading less than or equal to 50 μm,
    wherein the dry fruit is selected from the group consisting of seeds and shell fruits,
    the seeds and shell fruits are chosen from among almonds, hazelnuts, walnuts, cashew nuts, pecan nuts, pine nuts, pistachio nuts, sesame seeds, pumpkin seeds, sunflower seeds, poppy seeds, brazil nuts, macadamia nuts, Queensland nuts, Nangail nuts, chestnuts, peanuts, alone or mixed, and
    said product is solid at ambient temperature.

2. The sweetened food product according to claim 1, wherein a size grading is between 15 and 25 μm.

3. The sweetened food product according to claim 1, wherein the dry fruit has a fat content less than or equal to 65%.

4. The sweetened food product according to claim 1, wherein the emulsifier is lecithin.

5. A manufacturing method producing the sweetened food product according to claim 1, including the following steps:
    (a) mix and knead said sugar or other sweetening material, said dry fruit, said cocoa butter or cocoa butter substitute and said emulsifier;
    (b) grind said mix obtained in step (a);
    (c) mix at a temperature higher than or equal to 40° C. for at least two hours;
    (d) optionally, tempering.

6. The method according to claim 5, wherein the grinding step (b) and the mixing with heating step (c) are carried out at the same time.

7. The sweetened food product according to claim 2, wherein the dry fruit has a fat content less than or equal to 65%.

* * * * *